United States Patent
Trager et al.

(10) Patent No.: US 8,862,425 B2
(45) Date of Patent: Oct. 14, 2014

(54) FAILURE SENSING AND CONTROL SYSTEM FOR CYCLE TESTING

(75) Inventors: Christian A. Trager, Canton, MI (US); Michael J. Niel, Redford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 408 days.

(21) Appl. No.: 12/963,894

(22) Filed: Dec. 9, 2010

(65) Prior Publication Data
US 2012/0150472 A1    Jun. 14, 2012

(51) Int. Cl.
G01L 25/00 (2006.01)
G01M 99/00 (2011.01)
G01M 7/00 (2006.01)

(52) U.S. Cl.
CPC .................................. G01M 99/008 (2013.01)
USPC ............ 702/113; 702/114; 702/115; 702/116

(58) Field of Classification Search
CPC .............................. G06F 11/008; G06F 17/40
USPC .................................................. 702/113–126
See application file for complete search history.

(56) References Cited

U.S. PATENT DOCUMENTS

| | | | |
|---|---|---|---|
| 3,585,599 A | 6/1971 | Hitt et al. | |
| 4,403,942 A | 9/1983 | Copenhaver | |
| 4,428,022 A | 1/1984 | Engel et al. | |
| 4,504,778 A | 3/1985 | Evans | |
| 5,065,104 A | 11/1991 | Kusko et al. | |
| 5,715,125 A | 2/1998 | Neiger et al. | |
| 5,770,836 A | 6/1998 | Weiss | |
| 6,780,033 B2 | 8/2004 | Liu | |
| 7,092,786 B2 * | 8/2006 | Yasugi et al. | 700/174 |
| 7,453,677 B2 * | 11/2008 | Bucella et al. | 361/62 |
| 2006/0224811 A1 | 10/2006 | Sichner et al. | |
| 2007/0090694 A1 | 4/2007 | Pullmann et al. | |

FOREIGN PATENT DOCUMENTS

JP    07-334392    12/1995

* cited by examiner

*Primary Examiner* — Phuong Huynh
(74) *Attorney, Agent, or Firm* — Snell & Wilmer LLP

(57) ABSTRACT

A sensing and control system terminates a cycle test when it senses the part being cycle tested is about to fail. The sensing and control system uses a sensor for generating a signal each time the test part completes a motion cycle. The sensing and control system uses a controller, responsive to the sensor, for determining whether a failure is about to occur and stopping the cycle test.

19 Claims, 5 Drawing Sheets

FAILURE SENSING AND CONTROL SYSTEM FOR CYCLE TESTING

BACKGROUND OF THE INVENTION

1. Field of the Invention

The present invention generally relates to a system for cycle testing, and more particularly to a failure sensing and control system for cycle testing.

2. Description of the Related Art

Cycle testing is a quality control process. It ensures that the functionality and durability of manufactured products meet certain industry standards. For example, a cycle test can be used to test a particular door of a car to determine whether the door can be opened and closed for at least 50,000 times without failure. Some parts can fail during a cycle test. Conventional cycle test systems do not have any built-in mechanism to detect failure and terminate the cycle test. Because a cycle test is not timely terminated, the failing part will be overstressed and broken. Hence, the failed part cannot be adequately analyzed as to the cause of failure.

There is a need for a sensing and control system that can monitor and terminate the cycle test when a part is starting to fail.

SUMMARY OF THE INVENTION

A sensing and control system that monitors and automatically terminates a cycle test when the part being tested is about to fail. The sensing and control system is implemented to be highly portable and flexible, making it convenient to use in conjunction with a variety of cycle test stations. A simple and user-friendly interface allows operation with minimum human intervention. The sensing and control system uses a sensor and a controller. The sensor generates a signal every time the part being cycle tested completes a motion cycle. The controller utilizes the signal to determine the duration of the motion cycle. If the sensed duration of the motion cycle exceeds the predefined cycle duration by a tolerance margin, this is taken as an indication that the part being cycle tested is about to fail. In response, the controller stops the cycle test before the part being tested is damaged.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
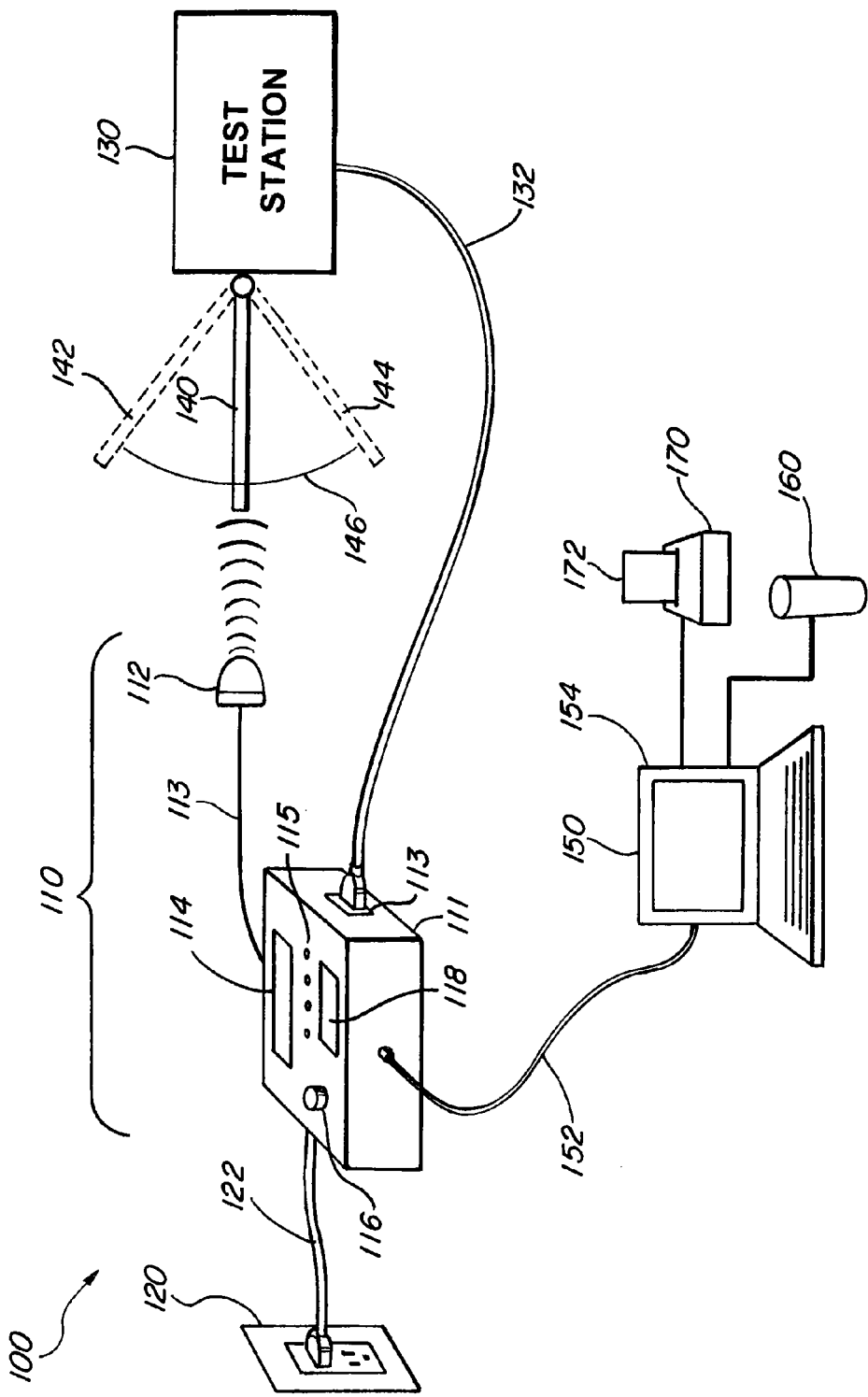
FIG. 1 is a block diagram illustrating a sensing and control system according to an embodiment of the present invention.

FIG. 1 shows a cycle test setup 100, having a sensing and control system 110 connected to a power supply 120, a cycle test station 130, and a processor 150 connected to the sensing and control system 110. The cycle test station 130 is typically used for testing the functionality and durability of a part 140 by continuously moving the part 140 back and forth. For example, the part 140 may be a door of an automobile, wherein the hinges of the door are being tested by moving the part 140 back and forth for a predetermined number of cycles.

The cycle test station 130 moves a part 140 from a first position 142 to a second position 144 and from the second position 144 back to the first position 142. If the part 140 is a door, the first position 142 could be a closed position. The second position 144 could be an open position. The part 140 being cycle tested completes one motion cycle 146 each time it moves from the first position 142 (closed door) to the second position 144 (open door), passing by a sensing position, which may be located anywhere between the first position 142 and the second position 144.

The sensing and control system 110 includes a controller 111 and a sensor 112. The sensor 112 senses movement of the part 140 and generates a sensing signal each time the part 140 moves past the sensor 112. Each sensing signal indicates that the part 140 has completed one motion cycle. The sensor 112 receives power from a power supply 120 through the controller 111. The sensor 112 may be any sensor capable of sensing motion of a moving part 140. For example, the sensor 112 may be a motion sensor, an optical sensor, a proximity sensor, a pressure sensor, or a contact sensor. In order to fine tune the sensing process, multiple sensors 112 may be used for sensing increments of a motion cycle 146. For example, the sensing and control system 110 may include first and second sensors. The first sensor would be placed to sense a first half of the motion cycle 146. The second sensor would be placed to sense a second half of the motion cycle 146.

The controller 111 receives power from the power supply 120 by a first power cable 122. The controller 111 provides power to the cycle test station 130 by a second power cable 132. The sensor 112 provides its sensing signals in real time to the controller 111 by a connection 113. The connection 113 may be a hard wire or wireless connection.

The controller 111 analyzes each sensing signal received from the sensor 112. Depending on the objective of the cycle test, a test failure may be declared when the part 140 fails to complete one motion cycle 146 within a predetermined time period. Or, a test failure may be declared when the part 140 takes longer than a predetermined duration to complete one motion cycle 146, or a plurality of motion cycles 146. The absence of a sensing signal during a motion cycle may signify that the part 146 has stopped moving or is stuck at a particular position and thus unable to complete the motion cycle 146. The controller 111 generally determines a test failure has occurred when it does not receive a sensing signal within a predetermined time period after the previous sensing signal.

The predetermined time period may be based on an average duration of a typical motion cycle for a particular part 140. A tolerance margin to accommodate inter-cycle variation may be added. For example, the average duration of a typical motion cycle may be about 30 seconds with an inter-cycle variation of about 5 seconds. The predetermined time period may be set to about 35 seconds. The controller 111 will determine a test failure a sensing signal is not received within 35 seconds after the last received sensing signal.

Upon determining a test failure, the controller 111 will stop the cycle test by cutting the power being supplied to the cycle test station 130. Alternatively, the controller 111 may generate a termination signal. The cycle test station 130 will stop moving the part 140 upon receiving the termination signal.

The controller 111 preferably has several user interfaces, including a control dial 116, a motion cycle duration display screen 114, a motion cycle counter display screen 118, and a set of cycle test indicators 115. The control dial 116 allows a user to start, stop, preset and reset the controller 111. The motion cycle duration display screen 114 displays the time elapsed during one motion cycle. The motion cycle counter display screen 118 displays the number of sensing signals generated, which is representative of the number of motion cycles 146 the part 140 has completed. The set of cycle test indicators 115 can be a plurality of light emitting diodes (LEDs). Particularly, each of the indicators 115 is used for indicating one of the events related to the cycle test. The events may include cycle test preset, cycle test reset, cycle test in progress, and test failure detected.

During a cycle test, the controller 111 sends test results to a processor 150 by a communication link 152. The controller 111 may notify the processor 150 once a test failure occurs. The processor 150 will respond accordingly. Depending on the system architecture, the communication link 152 may be hardwired or wireless. The processor 150 may be any computing device capable of receiving data, processing the received data, and storing and outputting the processed data. The processor 150 typically has a display 154 and a memory 160. The processor 150 may be coupled to a printer 170.

The test results sent to the processor 150 may include a pass indicator, indicating that the part 140 has completed the cycle test, or a fail indicator, indicating that the part 140 has failed the cycle test. Besides a pass/fail indicator, the test results may include the total number of motion cycles the part 140 has completed and the average duration of the completed motion cycles. The processor 150 is enabled to process and analyze the test results and generate a printed test report 172, documenting the analyzed test result. Moreover, the processor 150 can store the current test result to the memory 160 and/or retrieve past test results from the memory 160. Accordingly, the processor 150 can perform statistical analysis for a particular type of part.

Figure 2:
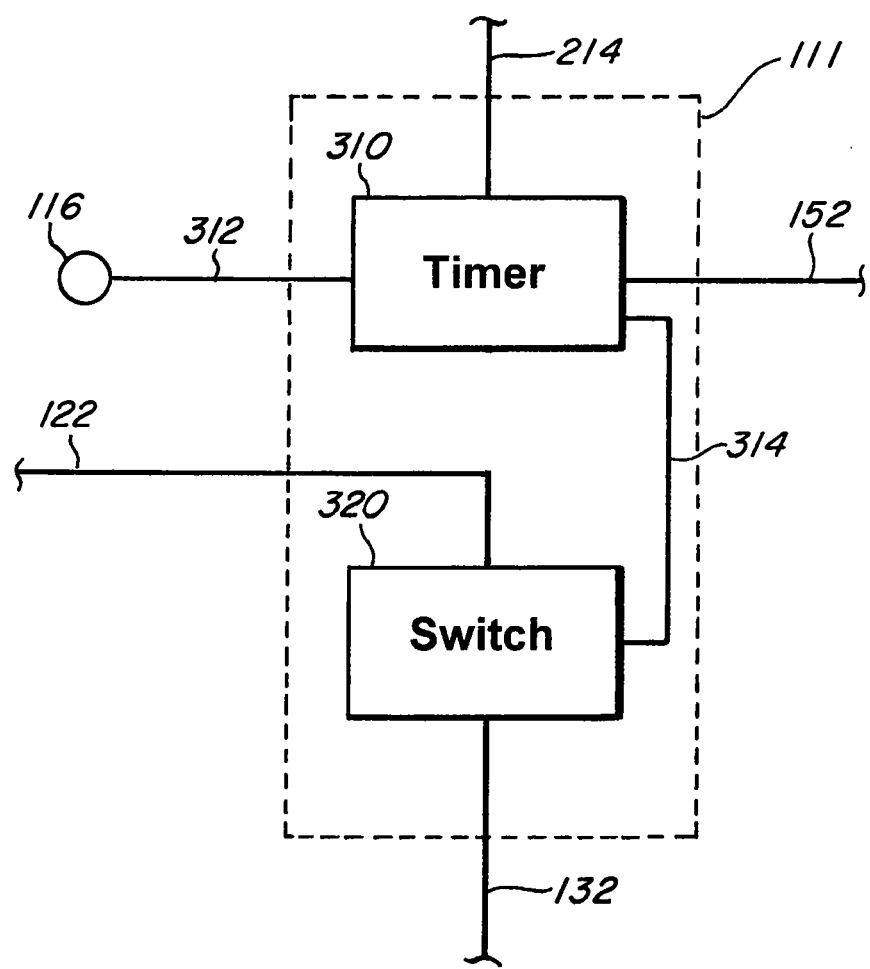
FIG. 2 is a block diagram of a controller according to an embodiment of the present invention.

FIG. 2 shows the controller 111. The controller 111 includes a timer 310 and a power switch 320 connected to and controlled by the timer 310. The power switch 320 controls the connection between the power supply 120 and the cycle test station 130.

During test setup, a user may input a predefined cycle duration value to the timer 310 via line 312 by using the control dial 116. The predefined cycle duration value may be obtained by averaging the duration of several motion cycles of the part 140 to be tested. The predefined cycle duration value preferably incorporates a tolerance margin for inter-motion-cycle variation. For example, the tolerance margin may range from about 0.1 second to about 10 seconds. Or, the tolerance margin may range from about 0.5 second to about 5 seconds. Or, the tolerance margin may be about 3 seconds.

After the timer 310 is preset with a predefined cycle duration value, the cycle test may begin. The timer 310 is configured to respond to the sensing signals on line 217 from the sensor 112. The timer 310 includes a counter or an accumulator, which will count to determine the duration of a sensed motion cycle. The timer 310 will reset each time it receives a sensing signal. After being reset by the sensing signal 214, the timer 310 will begin counting the duration of the sensed motion cycle.

The timer 310 compares the predefined motion cycle duration value with the duration of each sensed motion cycle being sensed. If the part 140 does not complete a motion cycle during the predefined duration, the sensing signal will not be generated, and the timer 310 will not be reset within the predefined motion cycle duration. Consequently, the duration of the sensed motion cycle will be greater than the predefined motion cycle duration value. When the duration of the sensed motion cycle exceeds the predefined motion cycle duration value by the tolerance margin, a test failure is indicated. In response, the timer 310 then generates a termination signal sent via the line 314 to the power switch 320.

The power switch 320 receives input power over the cable 122 and delivers the power over the cable 132 to the cycle test station 130. Delivery of power to the cycle test station 130 is controlled by the termination signal 314 from the timer 310. The cycle test station 130 stops cycling the part 140 when the power switch 320 terminates power to the cycle test station 130.

Figure 3:
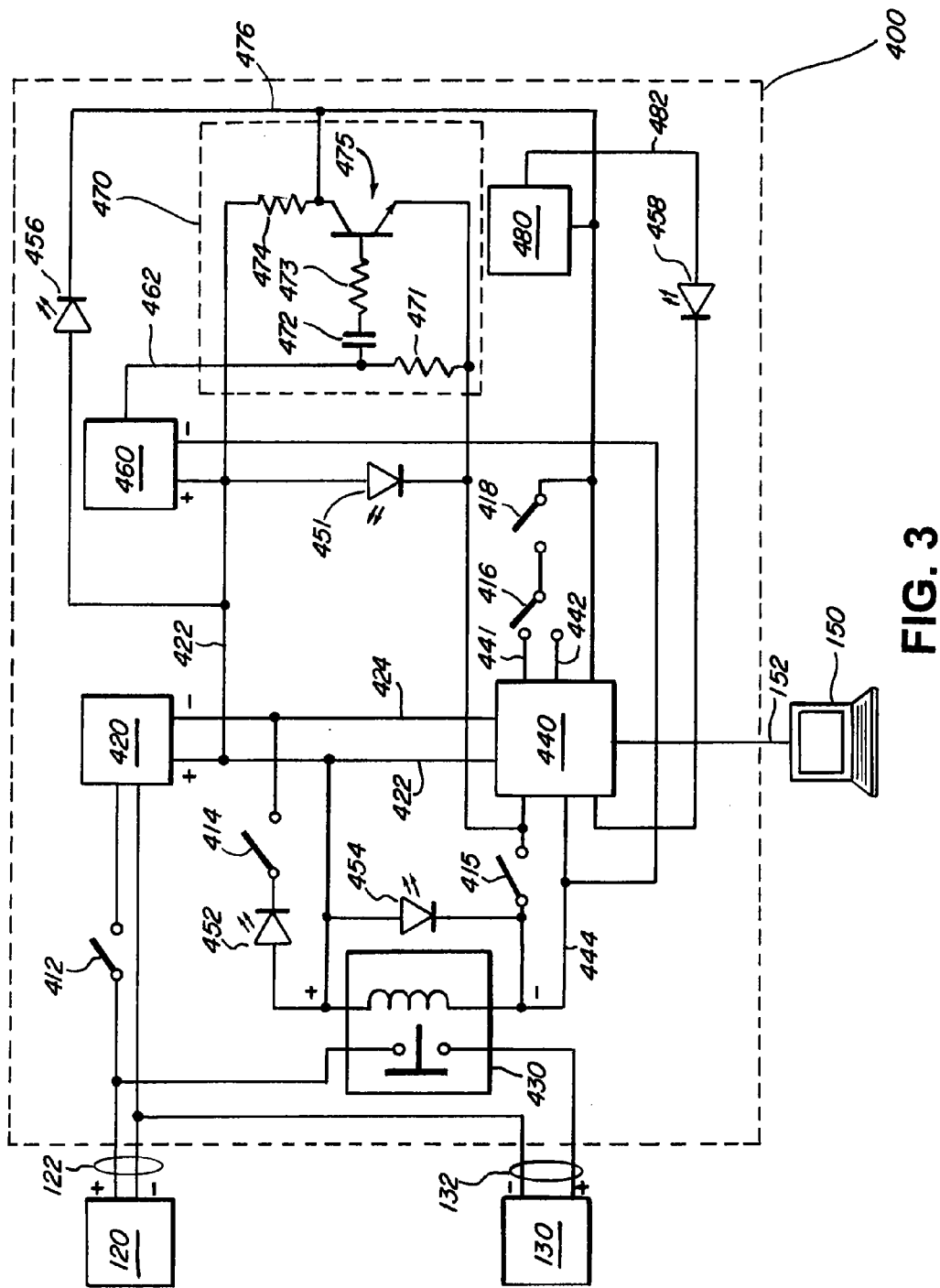
FIG. 3 is a schematic of a sensing and control system according to an embodiment of the present invention.

FIG. 3 is a schematic of preferred circuitry 400 for the sensing and control system 110. The preferred circuitry 400 includes a power regulator 420, configured to convert AC power received from the power supply 120 to an internal DC voltage. For example, the power regulator 420 may deliver a 12 V internal DC voltage. The positive potential of the internal DC voltage is carried by the positive supply node 422, which delivers the DC voltage to a sensor 460 and a timer 440.

The sensor 460 may be a motion sensor, an optical sensor, a proximity sensor, a pressure sensor, or a contact sensor. Preferably, the sensor 460 is a mini-beam sensor. The sensor 460 generates a sensing signal each time it senses a part completing a motion cycle. The sensing signal is carried by the sense node 462 to an amplifying stage 470. The amplifying stage 470 will generate a reset signal in response to receiving a sensing signal. The reset signal is delivered to the timer 440 by a reset node 476. The amplifying stage 470 may be implemented by a variety of circuits. For example, the amplifying stage 470 may include a transistor 473 for amplifying the sensing signal, a bias resistor 471 for biasing the input voltage of the transistor 475, a high pass capacitor 472 and a resistor 473 for filtering low frequency input voltage, and a pull up resistor 474 for biasing the output of the transistor 475.

Upon receiving a reset signal, the timer 440 will be reset so that the sensed motion cycle has zero duration. After being reset, the timer 440 will again begin counting the duration of the sensed motion cycle, until the timer 440 receives the next reset signal. In between successive reset signals, the timer 440 compares the duration of the sensed motion cycle with the predetermined motion cycle value. When the duration of the sensed motion cycle exceeds the predetermined motion cycle value by a tolerance margin, the timer 440 will indicate a test failure by toggling a termination signal at an output node 444. The termination signal has a low voltage value before a test failure is indicated. The termination signal has a high voltage after a test failure is indicated.

A relay device 430 is preferably used as the power switch 320 (FIG. 3). The relay device 430 will be turned on when the voltage of the termination signal is substantially lower than the internal DC voltage of the sensing and control system 400. The relay device 430 will be turned off when the termination signal has a voltage that substantially equals the internal DC voltage.

When the relay device 430 is turned on, it closes a switch between the cycle test station 130 and the power supply 120. However, when the relay device 430 is turned off, it opens the switch between the cycle test station 130 and the power supply 120. Depending on the design needs, the relay device 430 may be a solid state relay, a solid state contactor relay, a reed relay, a polarized relay, a contactor relay, or a dry contact switch relay.

The preferred circuitry 400 includes a set of switches. A power switch 412 is coupled between the power source 120 and the power regulator 420, and it is used for turning the sensing and control system 400 on and off. A pair of bypass switches 414 and 415 is used for bypassing the termination signal, such that the relay device 430 can stay powered on during the initial setup process. A pause switch 416 is selectively connected to a run node 441 or a stop node 442 of the timer 440. The pause switch 416 is used for pausing and resuming the timer 440. A reset switch 418 is coupled to the reset node 476 for manually resetting the timer 440. The control dial 116 (FIG. 1) is used for toggling the set of switches. Alternatively, each of the switches may be accessed and controlled individually.

The sensing and control system 400 may include a counter 480 and a set of LED indicators. The counter 480 is coupled to a reset node 476. The counter 480 counts the number of reset signals being generated. The counter 480 can be used for counting the number of motion cycles completed by the part under test. A power indicator LED 451 indicates that the sensing and control system 400 is turned on. A bypass indicator LED 452 indicates that the sensing and control system 400 is in setup. An output power indicator LED 454 indicates that the relay device 430 is delivering power from the power source 120 to the cycle test station 130. A motion cycle pending indicator LED 456 indicates that the part 140 under test is in the middle of a motion cycle. A motion cycle completion indicator LED 458 indicates that the part 140 under test has just completed one motion cycle.

Figure 4:
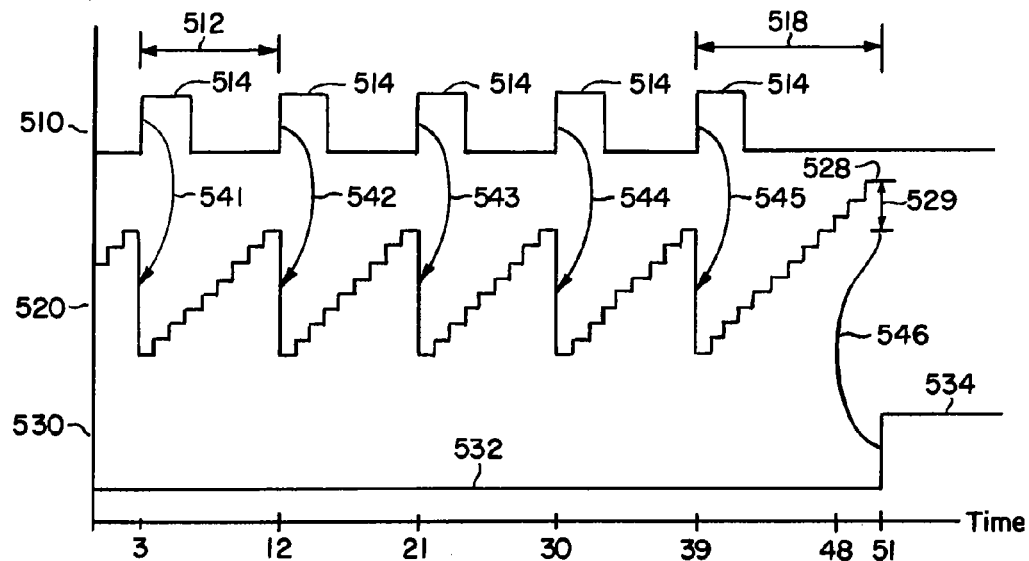
FIG. 4 is a waveform diagram of signals in the sensing and control system of FIG. 3 according to an embodiment of the present invention.

As shown in FIG. 4, the sensing and control system 400 generates a sensing signal 510, a sensed motion cycle duration signal 520, and a termination signal 530 during the cycle test. The sensing signal 510 is preferably a pulse signal 514, which is generated shortly after the sensor senses the part under test completing one motion cycle. The duration between successive pulse signals 514 in a normal test cycle is used for calculating the predetermined motion cycle duration 512.

The sensed motion cycle duration signal 520 is reset at the rising edge of each pulse signal 514. The sensed motion cycle duration signal 520 is the time elapsed value since reception of the last pulse signal 514. When the sensed motion cycle duration signal 520 has a value that is less than the predefined motion cycle duration value 512, the termination signal 530 will not be toggled. The cycle test continues, and the sensed motion cycle duration signal 520 is reset when the part under test completes the first 541, second 542, third 543, fourth 544, and fifth 545 motion cycles, each of which may take about 9 seconds.

When the part is stuck, for example, and thus fails to finish the sixth motion cycle, no pulse signal 514 will be generated. As a result, the sensed motion cycle duration signal 520 will not be reset for at least an extended period 518. Thus, the value of the sensed motion cycle duration signal 520 reaches a maximum threshold level 528, which signifies that the sensed motion cycle has exceeded the predefined motion cycle duration 512 by a tolerance margin 529. At that point, a test failure 546 is indicated, and a termination signal 534 is toggled from a low state 532 to a high state 534. In response, the power transmission to the cycle test station is terminated by the relay device.

Figure 5:
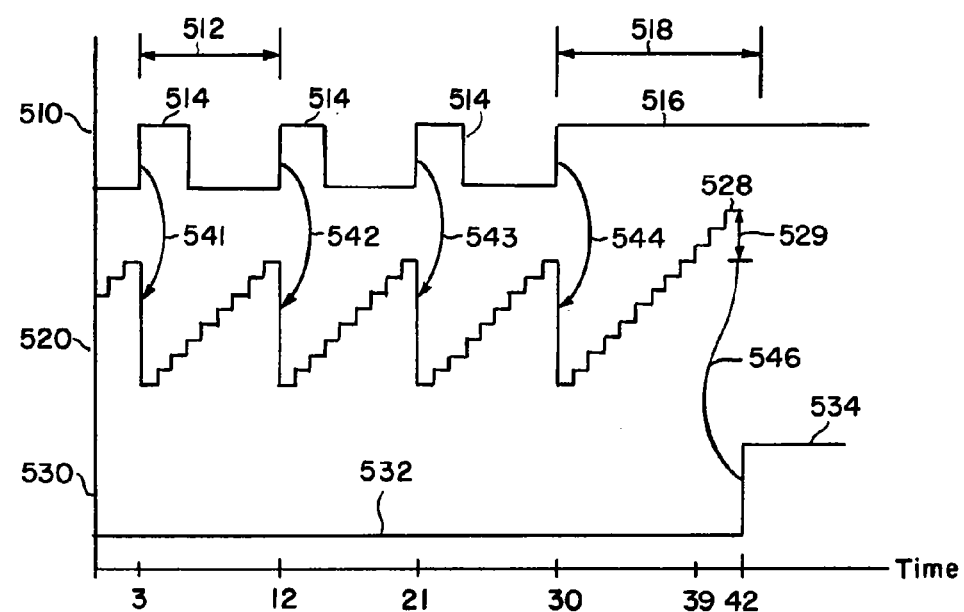
FIG. 5 is a waveform diagram of signals in the sensing and control system of FIG. 3 according to an embodiment of the present invention.

FIG. 5 illustrates another scenario for toggling the termination signal 530. The part under test may be stuck at the sensing position right after the completion of the fourth motion cycle 544. The pulse signal 516 will stay high and the next pulse signal will not be generated for at least an extended period 518. The sensed motion cycle duration signal 520 will not be reset again for at least the extended period 518. As a result, the sensed motion cycle duration signal 520 will reach the maximum threshold level 528. Indication of a test failure 546 will then follow, toggling the termination signal 530.

Figure 6:
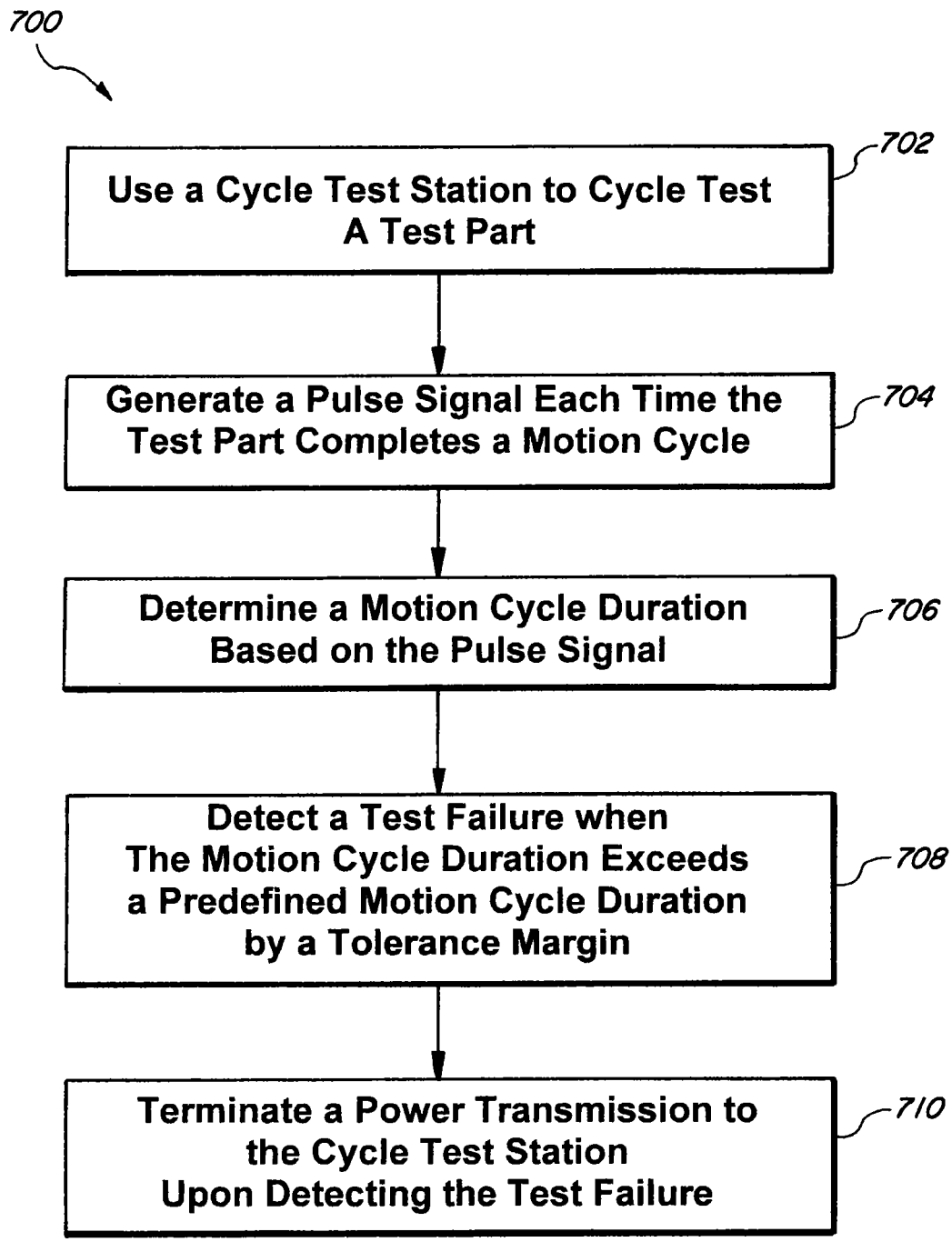
FIG. 6 is a flow chart of a method practiced by an embodiment of the present invention.

FIG. 6 is a flow chart of a method 700 practiced by a preferred embodiment of the present invention. In step 702, a part is cycle tested by a cycle test station. In step 704, a pulse signal is generated each time the part under test completes a motion cycle. In step 706, the duration of each motion cycle is determined based on the pulse signal generated. The duration of the motion cycle is reset at the rising edge of each pulse signal, and it is increased according to the time elapsed since the last pulse signal.

In step 708, a test failure is detected if the duration of the sensed motion cycle duration signal 520 exceeds a predetermined motion cycle duration by a tolerance margin. That is, due to the absence of the pulse signal, the motion cycle duration is not reset for an extended period of time. When the extended period of time is greater than the sum of the predefined motion cycle duration and the tolerance margin, a test failure is determined. The predefined cycle duration is calculated by averaging the duration of several motion cycles. In step 710, power transmission to the cycle test station is terminated upon a test failure being determined.

Obviously many modifications and variations of the present invention are possible in light of the above teachings. It is therefore to be understood that within the scope of the appended claims the invention may be practiced otherwise than as specifically described.

What is claimed is:

1. A failure sensing and control system for a cycle test station, comprising:
    a sensor configured to sense motion of a part being cycle tested and generate a signal indicating a completion of a first motion cycle and a second motion cycle; and
    a controller configured to:
        receive the signal from the sensor,
        measure an elapsed amount of time from a beginning of the second motion cycle based on the signal,
        determine that a test failure has occurred when the elapsed amount of time from the beginning of the second motion cycle reaches a predetermined amount of time before the completion of the second motion cycle, and
        stop the cycle test station when the test failure has occurred.

2. The system of claim 1, wherein the signal generated by the sensor includes a pulse at the completion of each of the first motion cycle and the second motion cycle.

3. The system of claim 1, wherein the controller is configured to stop the cycle test station by terminating power to the cycle test station.

4. The system of claim 2, further comprising:
    a timer configured to reset when each of the pulses is received and measure a duration of the second motion cycle based on the signal.

5. The system of claim 1, further comprising:
    a switch controlled by the controller and configured to terminate power to the cycle test station.

6. The system of claim 5, wherein the controller is configured to generate a termination signal in response to the determination that the test failure has occurred and to cause the switch to be in an off state in response to the termination such that power to the cycle test station is terminated.

7. The system of claim 1, wherein the predetermined amount of time is about 0.1 second to about 10 seconds beyond the average duration of a plurality of motion cycles.

8. The system of claim 1, wherein the predetermined amount of time is substantially the same as the average duration of a plurality of motion cycles.

9. The system of claim 1, further comprising:
a counter responsive to the signal and configured to count a quantity of completed motion cycles.

10. The system of claim 9, wherein the counter stops counting upon the determination that the test failure has occurred.

11. The system of claim 1, further comprising:
a processor responsive to the controller and configured to analyze the test failure; and
an output device coupled to the processor and configured to output a test failure report based on the analyzed test failure.

12. A system for controlling a cycle test station cycling a part, comprising:
a sensor configured to sense motion of the part and generate a pulse signal having a plurality of pulses, each of the plurality of pulses indicating completion of each of a plurality of motion cycles;
a timer responsive to the generated pulse signal and configured to reset each time one of the plurality of pulse signals is received and measure an elapsed amount of time for each of the plurality of motion cycles;
a controller coupled to the timer and configured to generate a termination signal indicating a test failure in response to the elapsed amount of time of one of the plurality of motion cycles reaching a predetermined amount of time before the pulse corresponding to the completion of the one of the plurality of motion cycles is generated; and
a switch configured to terminate power to the cycle test station in response to the termination signal.

13. The system of claim 12, wherein the predetermined amount of time is about 0.1 second to about 10 seconds beyond the average duration of several motion cycles.

14. The system of claim 12, further comprising:
a counter responsive to the signal and configured to count a quantity of completed motion cycles.

15. The system of claim 12, further comprising:
a processor responsive to the controller and configured to process the termination signal; and
an output device coupled to the processor and configured to output a test failure report based on the processed termination signal.

16. A method for sensing failure and controlling a cycle test station, comprising the steps of:
generating, at a sensor, a signal based on motion of a part being cycle tested by a cycle test station, the signal indicating a completion of a first motion cycle and a second motion cycle;
measuring, using a timer, an elapsed amount of time from a beginning of the second motion cycle based on the signal;
determining, by a controller, that a test failure has occurred when the elapsed amount of time from the beginning of the second motion cycle reaches a predetermined amount of time before the completion of the second motion cycle; and
causing, using the controller, the cycle test station to stop in response to the occurrence of the test failure.

17. The method of claim 16, wherein the
signal includes a first pulse indicating the completion of the first motion cycle and a second pulse indicating the completion of the second motion cycle.

18. The method of claim 16, wherein the
predetermined amount of time is about 0.1 second to about 10seconds beyond the average duration of a plurality of motion cycles.

19. The method of claim 16, wherein causing the cycle test station to stop includes terminating, using a switch, power to the cycle test station.

* * * * *